No. 672,833. Patented Apr. 23, 1901.
J. K. SCHEIRER.
PROCESS OF SEPARATING GARLIC FROM WHEAT.
(Application filed Feb. 12, 1900.)

(No Model.)

WITNESSES:
Jos. A. Ryan
Amos W. Hart

INVENTOR
Jacob K. Scheirer.
BY Munn & Co.
ATTORNEYS

UNITED STATES PATENT OFFICE.

JACOB K. SCHEIRER, OF WILLIAMSPORT, MARYLAND.

PROCESS OF SEPARATING GARLIC FROM WHEAT.

SPECIFICATION forming part of Letters Patent No. 672,833, dated April 23, 1901.

Application filed February 12, 1900. Serial No. 4,935. (No specimens.)

*To all whom it may concern:*

Be it known that I, JACOB K. SCHEIRER, residing at Williamsport, in the county of Washington and State of Maryland, have invented an Improved Process of Separating Garlic from Wheat, of which the following is a specification.

When wheat is harvested, the garlic growing among it is still green and the seeds or bulbs are pulpy and juicy to a considerable degree. The garlic is necessarily cut along with the wheat and is threshed with it before the garlic-seeds have become entirely dry, and they being more or less broken in the thresher the juice exudes in contact with the wheat-kernels. The juice being sticky or glutinous, it forms a glaze on the wheat similar to that commonly exhibited by coffee-beans sold in the market. The juice is to a certain extent absorbed by the dry cuticle of the wheat, and the garlic odor is hence very noticeable in the latter; but the juice does not penetrate to the body of the grain, so that removal of the cuticle will also eliminate the garlic. The wheat is delivered to the miller with a partial garlic coat and contains also a large number of unbroken garlic-seeds. The latter have about the same size and weight as the wheat-kernels, and hence in the normal condition they cannot be removed therefrom by an air-blast. I am able to effect their complete removal by the process hereinafter described. I first subject the mingled garlic and wheat to pressure, which is so graduated as to crush the softer garlic without crushing the wheat. By this operation the garlic is not only flattened, but the juice contained in the pulpy portion is expressed, so that while the wheat is further coated with the juice the seeds are so far lightened as to permit their complete mechanical separation from the heavier wheat by means of an air-current. The next step is the immediate removal of the grain-cuticle, whereby the wheat is prepared for grinding into flour, having no trace of garlic.

In the accompanying drawings I illustrate a machine which I employ for carrying out my process.

Figure 1:
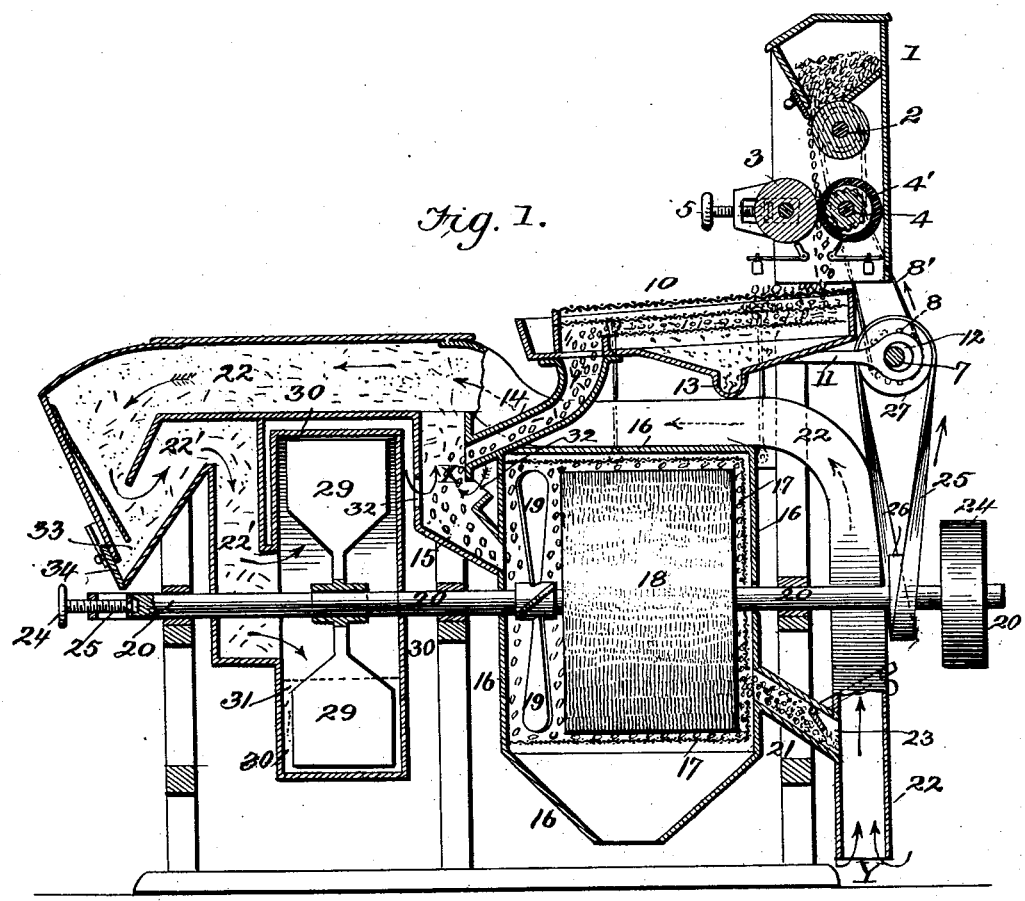
Figure 2:
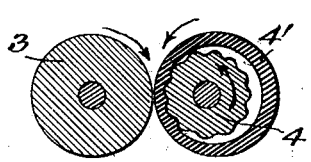
Figure 3:
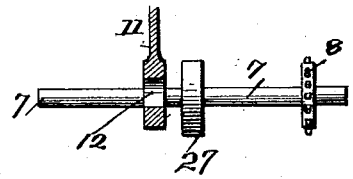

Figure 1 is a central vertical longitudinal section of my improved machine. Fig. 2 is an enlarged cross-section of the rolls by which the seed is crushed. Fig. 3 is a detail view of the counter-shaft from which motion is imparted to the sieves.

The wheat with which garlic-seed is mingled is delivered into the hopper 1, and its discharge therefrom is regulated by a rotary roll 2, from which it falls between the rolls 3 and 4, that crush the garlic without crushing the wheat. The roll 3 may be constructed of hard or unyielding material, preferably iron, and is adapted for adjustment toward and from the companion roll 4 by means of screws 5, which work in brackets and are attached to the slidable boxes in which the spindle of the roll 3 rotates.

It is indispensable that one of the rolls shall have an elastic surface in order that a pressure sufficient to crush the garlic without crushing the wheat may be applied. While any duly elastic roll may be employed, I preferably use one constructed as shown in Figs. 1 and 2, the same comprising the solid (say iron) center 4 and an enlarged soft-rubber covering 4' therefor, the same being cylindrical in form and having a considerably-larger diameter than the center 4, so that it is loose thereon, as shown best in Fig. 2. The rolls 3 and 4 are geared together and rotate in the same direction and derive motion from a shaft 7 through the medium of a sprocket-and-chain mechanism 8 and 8'. The hopper-roll 2 is driven by similar connection with the rolls. As the said rolls 3 and 4 rotate together the corrugations of the latter take or bite into the interior surface of the soft and loose covering 4', so that it rotates along with the solid center 4. The garlic-seed is thus crushed and flattened, while the wheat passes through without being crushed or broken.

The juice expressed from the garlic is slightly glutinous and adhesive, and for this reason as well as from the effect of mere mechanical pressure the garlic-seed and hulls thereof adhere to the rolls and require removal. For this purpose I employ the scrapers 9, each consisting of a straight-edged strip that works in contact with a roll and has a lever-arm arranged at an acute angle and extending horizontally. The said arm is weighted, and the scraper proper being pivoted at its angle the pressure applied to the roll may obviously be graduated as required to effectively clean the rolls as they rotate.

In the drawings the garlic is indicated by short straight marks or dashes thus, (- -,) while the wheat is represented by small circular or oblong figures. The whole wheat-kernels and flattened garlic-seeds remain intermingled until they reach that point where they are acted on by the air-current at X, the air being admitted through an adjacent opening 32 in spout 15. Such current is created by a suction-fan 29, mounted on a shaft 20 in a casing 30, having a discharge-opening adjacent to its bottom. The mingled wheat-kernels and flattened garlic-seed fall from rolls 3 4 upon sieves 10, which are shaken by a rod 11, extending to an eccentric 12 on shaft 7. The finer particles separated from the grain and garlic pass down through the sieves 10 and escape by the subjacent spout 13. The remaining coarser portion passes into the inclined spout 14, and thence into the angular and practically vertical spout 15, where the air-current received from opening 32 in the casing of fan 29 acts on it at $x$, as before stated, and completely separates the lighter garlic from the heavier wheat, the former being carried upward and delivered from the machine, while the heavier wheat descends by gravity and is further treated, as hereinafter described. It is important for the best result that the adhering coat of garlic shall be removed from the wheat immediately or before it has time to permeate the cuticle to any considerable extent. I therefore subject the wheat to an abrading action at once the garlic-seed has been removed. The wheat passes from spout 15 into the casing 16. The latter contains a wire screen 17, which in turn incloses on three sides a cylindrical rotating rough-surfaced cylinder 18 and a grain propelling or pushing device 19, which consists of a series of radial blades projecting from a central hub and arranged transversely at an angle of forty-five degrees to the rotatable shaft 20, whereon the said device 19 as well as the cylinder 18 are keyed. The function of the cylinder 18 is to break and remove the outer coat of the wheat, constituting what is commonly known as "bran" and to which the garlic-juice adheres. This operation is obviously effected by rubbing or friction of the cylinder and screen with the wheat-kernels as they pass through the latter. From the screen the cleaned kernels pass into the short inclined spout 21, leading to the vertical main spout 22, by which they are delivered from the machine into any suitable receptacle. (Not shown.) The bran or wheat covering removed from the wheat, being comminuted or in fine particles, passes for the most part through the screen 17 and is delivered from the open bottom of the casing 16 into any suitable receptacle. The screen 17 is preferably constructed of woven steel wire, and the cylinder 18 is constructed with a suitably-roughened surface.

The device 19 pushes the grain forward against and around and past the cylinder 18 and out of the screen 17, thereby insuring the duly forcible contact of the grain with the scourer or grinder 18 as well as its delivery from the screen. The progress of the grain in contact with the cylinder 18 and through the screen 17 is regulated, primarily, by the device 23, which is in the nature of a baffle or retarder and consists of a board or plate pivoted and arranged in the short spout 21 and provided with a rigid and weighted horizontal arm, as shown. The adjustment of the weight on said arm permits graduation of the rapidity of flow and in contact with the cylinder 18, as may be required by its condition, especially by its degrees of dryness, since the drier the grain-cuticle the more friction will be required to remove it, and vice versa. It is thus apparent that the devices 19 and 23 act in direct opposition to each other, one accelerating and the other tending to retard the flow of the grain.

To regulate the width of the space intervening the right-hand ends of the wire screen 17 and cylinder 18, I provide for lengthwise adjustment of the shaft 20 by means of a set-screw 24, which works in a bracket 25 and is rotatably connected with the left-hand end of the said shaft. The operation is obvious and enables the cylinder 18 to be shifted as required to vary the friction and scouring effect on the wheat-kernels, so as to insure complete removal of the garlic soaked or coated cuticle.

The main shaft 20 is provided with a large pulley 24 for application of a driving-band from a suitable motor. A belt 25, having a quarter turn or twist, runs from a smaller pulley 26 on shaft 20 to a similar pulley 27 on the counter-shaft 7. The latter may be arranged parallel to the main shaft 20 instead of at right angles, as shown, and in that case a corresponding change in position of the sieves and crushing-rolls would be required.

The conductor or trunk 22, from which the wheat is delivered at Y, is extended over the casings 16 and 30 and curved downward to connect with a zigzag branch 22', which communicates directly with the side of the fan-casing 30. Openings 32 are provided in spout 15 at the point X for admission of air, which takes an upward direction, as shown by curved arrows. Other arrows indicate the direction of air-current entering the conductor 22 at Y and carrying off from the wheat delivered from spout 21 dust and fine particles of bran, &c., which may be mingled with the wheat as it leaves the wire cylinder 17. This air-current obviously unites with that derived from spout 15, and both the flattened garlic and bran and dust are thus carried along to the zigzag branch conductor 22'. The garlic and other heavy particles are deposited in the pocket 33, having a slide 34 for allowing discharge of the same when required, while the dust and lighter particles of bran pass on into the fan-casing 30 and are discharged at 31.

From the foregoing description the operation of the machine as a whole is apparent and requires no further statement.

Having thus described my invention, what I claim, and desire to secure by Letters Patent, is—

The process described, consisting in subjecting mingled wheat and garlic-seed to pressure sufficient to crush the latter but not the wheat, eliminating the crushed garlic-seed from the wheat by an air-current, and immediately subjecting the wheat to an abrading, scouring, and polishing action to remove the coat of garlic while it is yet fresh, as described.

JACOB K. SCHEIRER.

Witnesses:
   LEVI J. STOFFLETT,
   HOWARD N. SWARTZ.